(12) United States Patent
Innis

(10) Patent No.: US 6,814,230 B2
(45) Date of Patent: Nov. 9, 2004

(54) OPTICAL DISC CARRIER

(76) Inventor: John Innis, 1193 N. Lancaster Cir., South Elgin, IL (US) 60177

( * ) Notice: Subject to any disclaimer, the term of this patent is extended or adjusted under 35 U.S.C. 154(b) by 116 days.

(21) Appl. No.: 10/047,271

(22) Filed: Jan. 15, 2002

(65) Prior Publication Data

US 2002/0170836 A1 Nov. 21, 2002

Related U.S. Application Data

(63) Continuation-in-part of application No. 09/800,066, filed on Mar. 6, 2001, now Pat. No. 6,349,823.

(51) Int. Cl.[7] .............................................. B65D 85/57
(52) U.S. Cl. ................................... 206/308.1; 206/484
(58) Field of Search ................................ 206/217, 307, 206/308.1, 309, 310, 232; 220/212, 906, 694, 729; 215/228, 229

(56) References Cited

U.S. PATENT DOCUMENTS

| | | | | |
|---|---|---|---|---|
| 2,306,726 A | * | 12/1942 | Hasin | 206/307 |
| 2,690,253 A | * | 9/1954 | Francois | 206/806 |
| 3,163,288 A | * | 12/1964 | Arvidsson | 206/363 |
| 4,413,298 A | * | 11/1983 | Pecsok et al. | 206/313 |
| 4,485,809 A | * | 12/1984 | Dellas | 128/156 |
| 4,505,770 A | * | 3/1985 | Larimore | 156/235 |
| 4,549,658 A | * | 10/1985 | Sfikas | 206/308.3 |
| 4,736,840 A | * | 4/1988 | Deiglmeier | 206/313 |
| 5,480,688 A | * | 1/1996 | Kaumeyer | 428/13 |
| 5,588,527 A | * | 12/1996 | Youngs | 206/308.1 |
| 5,857,565 A | * | 1/1999 | Baker et al. | 206/232 |
| 6,126,201 A | * | 10/2000 | Pace et al. | 281/29 |
| 6,299,014 B1 | * | 10/2001 | Nava et al. | 220/521 |
| 6,349,823 B1 | * | 2/2002 | Innis | 206/308.1 |
| 6,364,198 B1 | * | 4/2002 | Flynn | 229/75 |
| 6,463,026 B1 | * | 10/2002 | Anderson | 369/290 |

* cited by examiner

Primary Examiner—Shian T. Luong
(74) Attorney, Agent, or Firm—Thomas R. Vigil; Welsh & Katz, Ltd.

(57) ABSTRACT

The combination package or carrier for an optical disc comprising; a lower layer of flexible plastic material, an optical disc positioned on the lower layer and an upper layer sealed about the optical disc to the lower layer; an adhesive on an outer surface of the lower layer and a substrate, the package being fixed to the substrate with the adhesive.

22 Claims, 3 Drawing Sheets

OPTICAL DISC CARRIER

This application is a CIP of 09/800,066, now U.S. Pat. No. 6,349,823.

BACKGROUND OF THE INVENTION

1. Field of the Invention

The present invention relates to a carrier or a package for an optical disc or compact disc having advertising, promotional, informative or entertaining media thereon. The package is designed for easy opening and has an adhesive for adherence onto a substrate, such as a cereal box or a lid for a cup for a beverage, such as a soft drink.

2. Description of the Prior Art

Heretofore various packaging techniques have been proposed for carrying and displaying a compact disc. The simplest of these prior art packages or carriers is a package made up of two sheets of flexible, clear or translucent plastic material that are sealed together and cut along a square periphery and around a disc disposed between the two sheets. Typically, this is done by cutting and heat sealing the overlapping sheets in a generally square pattern.

In the manufacture of such a package, a first sheet is placed on a planar support surface followed by placing a compact disc on the first sheet, placing a second sheet over the disc and a first sheet and then, with a dielectric or radio frequency welding die forming the package by applying measured heat and pressure in a square pattern around the disc, thus sealing the disc between two square sheets of plastic material.

Numerous other packages or carriers comprising rigid plastic plates hinged together to form a small thin box have also been proposed. Still further, recent packages or carriers for compact discs are disclosed In the following U.S. patents:

| U.S. Pat. No. | Patentee |
|---|---|
| 2,306,726 | Hasin |
| 2,690,253 | Francois |
| 2,850,158 | Woodward |
| 3,163,288 | Arvidsson |
| 3,199,768 | Farmlet |
| 4,879,710 | Iijima |
| 5,620,271 | Bergh et al. |
| 5,732,818 | Koehn |
| 6,016,908 | Gaetano |
| 6,070,752 | Nava et al. |

SUMMARY OF THE INVENTION

According to the present invention there is provided a package or carrier for a compact disc, the package comprising a lower layer of flexible plastic material, a compact disc positioned on the lower layer and an upper layer sealed about the disc, and a layer of adhesive on an outer surface of the lower layer for fixing the package to a substrate.

DESCRIPTION OF THE PREFERRED EMBODIMENT(S)

Figure 1:
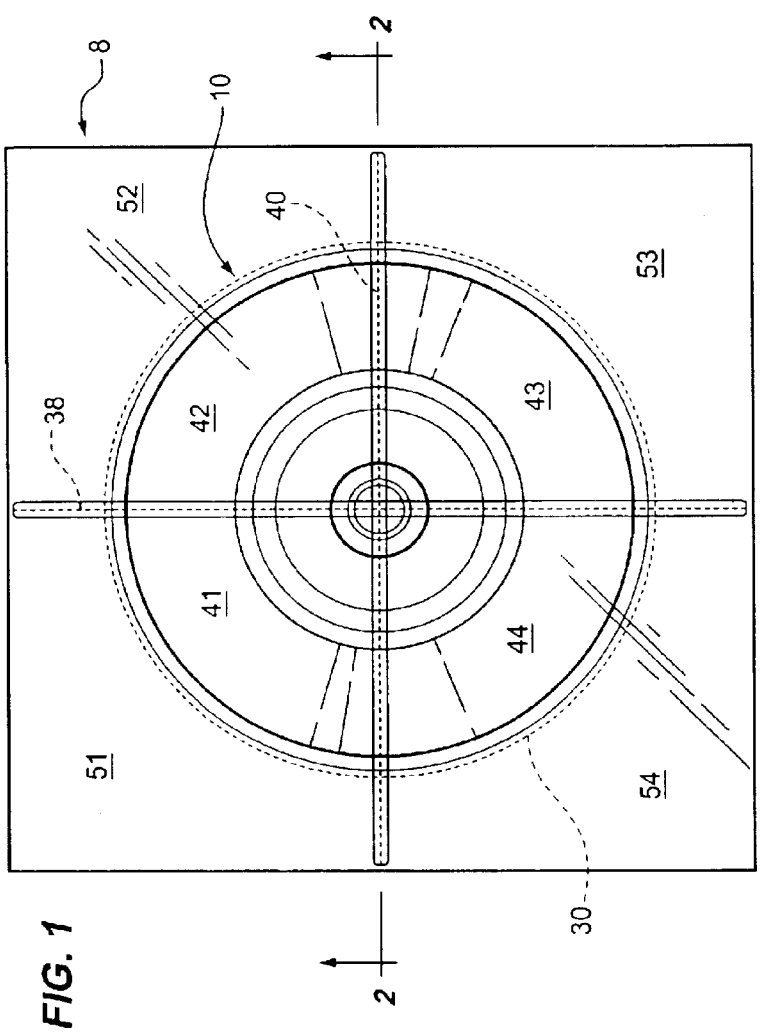
FIG. 1 is a top plan view of one embodiment of a package assembly and a compact disc package or carrier in the package assembly constructed according to the teachings of the present invention.

Referring to the drawings in greater detail, there is illustrated in FIG. 1, a package assembly 8 from which an optical or compact disc carrier or package 10 can be removed for being adhered to a substrate.

Figure 2:
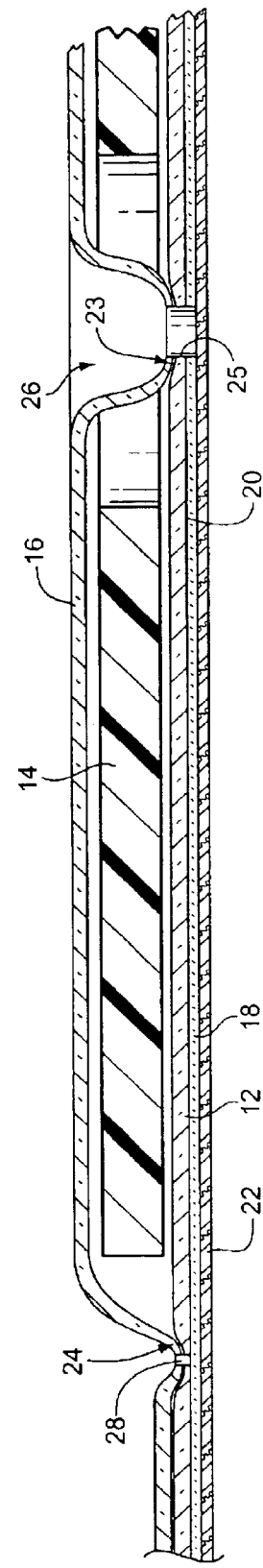
FIG. 2 is a cross-sectional view of the package assembly containing the compact disc package shown in FIG. 1 and is taken along 2—2 of FIG. 1.

As best shown in FIG. 2, it will be noted that the package 10 of the present invention comprises a first or bottom layer 12 of flexible, clear, plastic material, a compact disc 14 positioned on the bottom layer 12 and a top layer 16 of flexible, dear plastic material over the compact disc 14. Also, as shown, an adhesive 18 is applied on a bottom surface 20 of the lower layer 12. Then, to facilitate shipping, a paper or plastic liner 22 is fixed to and beneath the adhesive 18.

The upper layer 16 is sealed to the lower layer 12 by a radio frequency die which applies heat and pressure in two concentric circles 23 and 24. The inner circle 23 defines a seal 23 around a circular hole 25 in the center of the package 10 which extends through the upper layer 16, the lower layer 12 and the adhesive 18. To create the seal 23, the die creates a depression 26 in the upper layer 16 in the central area of the package 10 and a cutting die crates the circular hole 25.

The outer larger circle 24 defines an outer seal 24 adjacent an outer edge 28 of the package 10 defined at a cut line 28 cut by a die. It will be understood that when the package 10 is formed, a concentric circle die is brought down over the upper layer 16 and heat seals and cuts a large outer circle indicated by the cut line 28 and at the same time a smaller circle die seals and cuts the center circular hole 25.

The die cuts through the upper layer 16, the lower layer 12 and the adhesive 18.

As best shown in FIG. 1, at the same time that the concentric circle die comes down on the two layers 16 and 12, the die also has two cross, cut knife blades, each of which makes a so-called Kiss Cut in the upper layer 16 to form two perforated lines, score lines or cuts 38 and 40 in the upper layer 16 only.

The resulting circular package 10 can then be lifted off of the paper liner 22 and adhered by the adhesive 18 to a flat substrate, such as the outside of a cereal box or to a cover or lid for a beverage cup. The circular opening or hole 25 will allow a user to insert through a straw through the hole into the beverage cup for drinking a beverage. In this way, the carrier or package 10 can be given away on the cover or lid for a soft drink cup at a fast food restaurant, such as McDonald's®.

Figure 3:
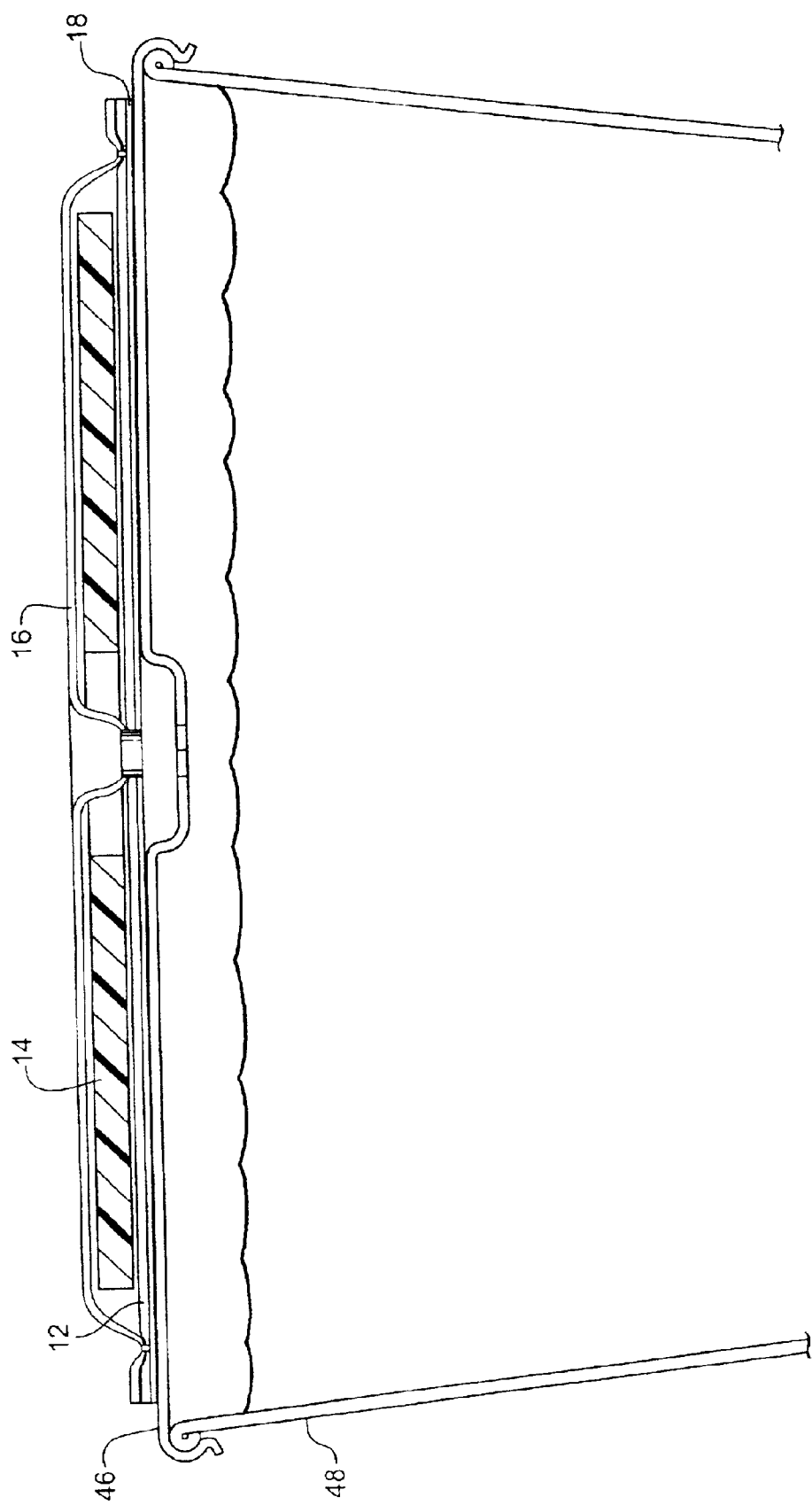
FIG. 3 is a sectional view through a combination of the package assembly of the present invention fixed with a layer of adhesive to the top of a circular lid or cover for a beverage cup.

In FIG. 3, there is illustrated such a combination of the package 10 and a cover 46 for a beverage cup 48.

The package 10 provides sufficient protection to the disc 14 therein and yet is easy openable by inserting a fingernail in the central depression 26 and engaging one of four pie shaped quadrants 41–44 formed by the Kiss Cut perforation lines 38 and 40 and the outer periphery 28 in the package 10. The package 10 is intended to be non-reusable so that once one peels back one or more of the pie-shaped quadrants 41–44 and removes the disc 14, the package 10 and anything it is attached to can be discarded.

For ease in shipment, a plurality of square package assemblies 8, as shown in FIG. 1 and including scrap areas 51–54 located radially outwardly of the pie-shaped quadrants 41–44, can be shipped to a fast food restaurant or a cereal manufacturer or other business entity and then the package 10 can be pulled away from the package assembly 6 and adhered to a substrate by means of the adhesive 18.

The lower and upper layers 12 and 16 are preferably made of a dear synthetic plastic material, such as polyvinylchloride (PVC), polyurethane (PU), polyethylene (PE), polypropylene (PP) or polystyrene. The dielectric or radio frequency (RF) welding and cutting device is of the type which has been used for years to make air tight and waterproof seals for products, such as inflatable boats, water toys, protective garments, fishing waders, etc. The die, which is usually brass, is lowered onto a pattern which is supported by an underlying base plate and then a timed pulse of radio frequencies is delivered between the die and the base plate. The energy heats the plastic material between the die and base plate to temporarily melt the plastic, thereby fusing the two pattern pieces together, such as an upper and lower layers 16 and 12. Once the layers 16 and 12 are fused and cut, the die is lifted and a new lower layer of plastic is moved into position, the CD is inserted on the lower layer, the upper layer is positioned over the lower layer and the cutting die is placed on top of this assembly and the process is repeated.

The cut or perforated cross cuts 38 and 40 are formed with a steel rule die by means of pressure which is used to form the so-called "Kiss Cut" which means that the material is not cut completely through the upper layer 16. In this way, scored or perforated lines 38 and 40 are formed with depressed material on either sides of the cut lines 38 and 40, as shown in FIG. 1.

The adhesive 18 on the lower side 20 of the lower layer 12 enables the package 10 to be applied to any package, carton, container, lid or substrate. Typically, the adhesive is a soft acrylic adhesive which offers high initial tack and when bonding low surface energy substrates, such as paper or board stock, while offering an excellent plasticizer migration resistance when bonding to flexible plastic containers or lids.

The package 10 permits an unobstructed view of the media disc fixed to the package which is fixed to a container or substrate. The perforated die cut lines 38 and 40 allow tamper resistance security in addition to protecting the disc from outside elements.

The adhesive liner 22 of the package assembly 8 allows the package 10 to be hand applied or applied in-line automatically without the need for spot gluing, die cutting, folding, tipping, insert molding, vacuum forming, injection molding, shrink wrapping, thermo-forming or taping.

The compact disc is typically a 3-¼" disc referred to in the trade as a "Mini-Round". It is also referred to as a 185 megabyte, 8 centimeter round optical media disc, which typically holds up to 20 minutes of media content which can be about an upcoming movie, such as a Disney® movie, or about characters in a movie, such as a dinosaur. It will be understood that the media content can be anything one can imagine and can be in the form of a commercial, an advertisement or video instructions for putting together an assembly. These are just some examples of the possible uses of the "Mini-Round".

Also, it will be appreciated that the package or carrier 10 of the present invention can be used for packaging full sized compact discs, as opposed to the "Mini-Round".

The upper layer 16 is made from a flexible, clear plastic material having a thickness from 1 mil to 50 mil. The compact disc or CD is typically an 8 centimeter round optical media disc. The lower layer 12 is also made of a flexible, clear plastic material with a thickness of 1 mil to 10 mils. The acrylic adhesive 18 is laminated to the outer surface 20 of the lower layer 12 and is provided with a plastic or paper release liner 22.

The adhesive 18 is laminated in a thin layer of permanent or removable adhesive between the paper release liner 22 and the lower layer 12 of plastic material.

From the foregoing description, it will be appreciated that the package package 10 has a number of advantages, some of which have been described above and others of which are inherent in the invention. In particular, the package 10 provides protection to a "Mini-Round" and provides viewing of the printed information on the "mini-Round", easy fixing of the "Mini-Round" to a substrate, evidence of a tampered package and an easy openable package to remove the "Mini-Round".

Also, it will be understood that modifications can be made to the package 10 of the present invention without departing from the teachings of the present invention.

For example, the center area of the package does not have to have a seal between the upper layer 16 and the lower layer 12. In such a construction only one, preferably arcuate, Kiss Cut is required in the upper layer16, whereby, a section of the upper layer16 can be peeled back and the disc 14 can be easily removed.

Figure 4:
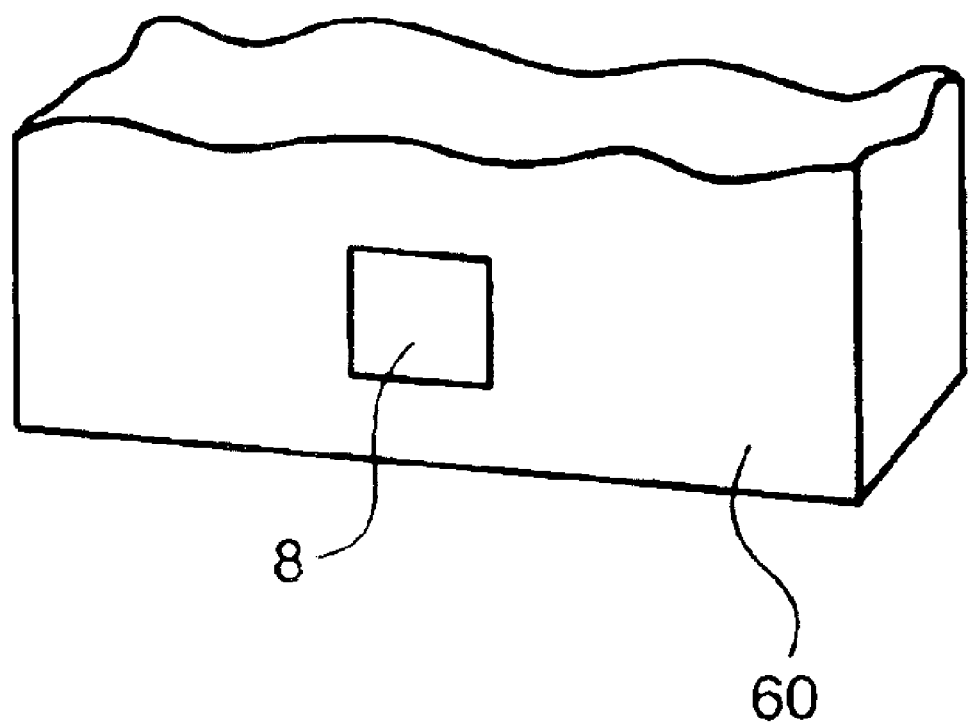
FIG. 4 is a perspective view of the package assembly mounted on the side of a box, such as cereal box.

Also the outer seal between the layers 12 and 16 does not need to be circular, although circular is preferred. Further, when the substrate is a paperboard box, such as cereal box 80 shown in FIG. 4, the outer seal of the package assembly 8 can have any desired configuration and can be adapted to correspond with printed graphics on the box. Also, as just noted above, the inner seal is not essential and lower and upper layers 12, 16 can be unsealed in the center area.

Then, when the substrate is a cover or lid, mating holes can be provided in the sealed or unsealed central area of the package 10 to permit a straw to extend therethrough and through a straw receiving hole in the cover. To keep liguid away from the disc 14, a sealed central area is preferred.

Accordingly, the scope of the invention is only limited as necessitated by the accompanying claims.

I claim:

1. The combination of a package or carrier for an optical disc, an optical disc, and a circular cover or lid for a beverage cup, said package comprising a lower layer of flexible plastic material, said optical disc being positioned on the lower layer and an upper layer sealed in two concentric circles to the lower layer, the inner circular seal surrounding an inner circular hole through said two layers and the outer circular seal extending in a circle around a periphery of said optical disc, an adhesive on an outer surface of the lower layer, said inner circular hole being aligned with a straw receiving center hole in said circular cover, and said package being fixed with said adhesive to said circular cover.

2. The combination of claim 1 wherein said optical disc is a "Mini Round".

3. The combination of claim 1 wherein said upper layer and said lower layer are made of a clear plastic material.

4. The combination of claim 1 wherein said two concentric circle seals are heat seals.

5. A package or carrier for an optical disc and a circular cover or lid for a beverage cup, said package comprising a lower layer of flexible plastic material, said lower layer being adapted to receive an optical disc on said lower layer and an upper layer sealed in two concentric circles to the lower layer, the inner circular seal surrounding an inner circular hole through said two layers and the outer circular seal adapted to extend in a circle around a periphery of the optical disc, an adhesive on an outer surface of the lower layer, said inner circular hole being aligned with a straw receiving center hole in said circular cover, and said package being fixed with said adhesive to said circular cover.

6. The package of claim 5 being constructed and arranged to receive a "Mini-Round".

7. The package of claim 5 wherein said upper layer and said lower layer are made of a clear plastic material.

8. The package of claim 5 wherein said two concentric circleseals are heat seals.

9. A combination of a circular cover for a beverage cup, an optical disc and a package for said optical disc comprising: a package including a lower layer of material, an optical disc on said lower layer of material, an upper, covering layer of material fixed to said lower layer about said optical disc, a center hole through said layers in alignment with a center opening in said optical disc, a layer of fastening material secured to an underside of said lower layer, and said layer of fastening material being fixed to an upper surface of said circular cover.

10. The combination of claim 9 wherein said lower layer and said covering layer are also fixed to each other around the center holes in said layers to prevent liquid from contacting said optical disc.

11. The combination of claim 9 wherein said layer of fastening material is a layer of adhesive.

12. The combination of a package or carrier for an optical disc and an optical disc, said package comprising a lower layer of flexible plastic material, said optical disc being positioned on the lower layer, an upper, covering layer over the lower layer and a generally circular seal area between the lower layer and the upper layer adjacent to and completely around said optical disc, at least one kiss cut in said upper layer above the disc a second, smaller, generally circular seal area between the lower layer and the upper layer in a central area of said package inwardly of said first named seal area and said at least one kiss cut extending from said second generally circular seal area toward said first named seal area for facilitating opening of said package by facilitating grasping and peeling back part of said upper layer above the disc, an adhesive on an outer surface of the lower layer to facilitate fixing of the package to a substrate, and a peel off liner fixed to the adhesive.

13. The combination of claim 12 wherein said central area has a circular hole through said sealed upper and lower layers.

14. The combination of a package or carrier for an optical disc, an optical disc and a paperboard box, said package comprising a lower layer of flexible plastic material which is adapted to receive thereon said optical disc and an upper layer sealed about the disc to said lower layer, an adhesive on an outer surface of the lower layer, at least one kiss cut through at least a portion of said upper layer of the package and extending across at least a portion of an upper surface of said package, said kiss cut being in the nature of a score or perforated line in said upper layer of said package to form a means for opening at least one section of said package by peeling back said at least one section of said package to remove said optical disc and said package being fixed with said adhesive to said paperboard box.

15. A package or carrier for an optical disc, said package comprising a lower layer of flexible plastic material, said lower layer being adapted to receive an optical disc on said lower layer and an upper layer sealed about a disc on the lower layer to the lower layer, an adhesive on an outer surface of the lower layer and a substrate, said package being fixed with said adhesive to said substrate.

16. The package of claim 15 wherein said substrate is a piece of paper.

17. The package of claim 15 wherein said substrate is a piece of plastic.

18. The package of claim 15 wherein said substrate is a side of a paperboard box.

19. The package of claim 15 wherein said substrate is a circular cover for a beverage cup and said upper and lower layers have a hole therethrough, generally aligned with a center hole in the optical disc, for receiving a straw which extends through a hole in said cover.

20. The package of claim 15 being constructed and arranged to receive a "Mini-Round".

21. The package of claim 15 wherein said upper layer and said lower layer are made of a clear plastic material.

22. A package for a disc having media recorded thereon, said package comprising a lower layer of flexible plastic material which is adapted to receive thereon a disc, an upper layer adapted to be placed over the disc and sealed to said lower layer by a generally circular seal area adjacent to and extending completely around the disc, at least one kiss cut through at least a portion of said upper layer of said package inwardly of said seal area and extending across at least a portion of an upper surface of said package for facilitating opening of said package, a second, smaller, generally circular seal area between the lower layer and the upper layer in a central area of said package inwardly of said first named seal area, said at least one kiss cut extending from said second generally circular seal area toward said first named seal area, and said kiss cut being in the nature of a score or perforated line in said upper layer of said package to form a means for opening at least one section of said package above the disc by peeling back said at least one section of said package above the disc to remove the disc.

* * * * *